US008818898B2

(12) United States Patent
Schlossberg et al.

(10) Patent No.: US 8,818,898 B2
(45) Date of Patent: Aug. 26, 2014

(54) SYSTEM AND METHOD FOR MANAGEMENT AND DISTRIBUTION OF MULTIMEDIA PRESENTATIONS

(75) Inventors: Craig Schlossberg, New York, NY (US); Declan Condron, New York, NY (US)

(73) Assignee: PumpOne, LLC, New York, NY (US)

( * ) Notice: Subject to any disclaimer, the term of this patent is extended or adjusted under 35 U.S.C. 154(b) by 502 days.

(21) Appl. No.: 12/404,138

(22) Filed: Mar. 13, 2009

(65) Prior Publication Data

US 2009/0282080 A1 Nov. 12, 2009

Related U.S. Application Data

(62) Division of application No. 11/567,728, filed on Dec. 6, 2006.

(60) Provisional application No. 60/742,930, filed on Dec. 6, 2005.

(51) Int. Cl.
*G06Q 99/00* (2006.01)
*G06Q 30/02* (2012.01)
*G06Q 30/06* (2012.01)

(52) U.S. Cl.
CPC ............ *G06Q 30/02* (2013.01); *G06Q 30/0621* (2013.01); *G06Q 2220/12* (2013.01); *G06Q 30/0601* (2013.01)
USPC ............ 705/51; 705/26.5; 705/342; 705/344; 482/148

(58) Field of Classification Search
USPC .................... 705/26.5, 51, 342, 344; 482/148
See application file for complete search history.

(56) References Cited

U.S. PATENT DOCUMENTS

| 5,633,678 | A | | 5/1997 | Parulski et al. |
|---|---|---|---|---|
| 5,826,102 | A | * | 10/1998 | Escobar et al. ............... 715/202 |
| 5,892,900 | A | * | 4/1999 | Ginter et al. .................... 726/26 |
| 5,903,873 | A | | 5/1999 | Peterson et al. |
| 5,947,868 | A | | 9/1999 | Dugan |
| D416,249 | S | | 11/1999 | Amron |
| 6,213,872 | B1 | | 4/2001 | Harada et al. |
| 6,269,275 | B1 | | 7/2001 | Slade |
| 6,302,789 | B2 | | 10/2001 | Harada et al. |
| 6,468,086 | B1 | | 10/2002 | Brady-Koontz |
| D469,109 | S | | 1/2003 | Jobs et al. |
| D472,245 | S | | 3/2003 | Andre et al. |

(Continued)

FOREIGN PATENT DOCUMENTS

| AU | 2006321573 | 7/2008 |
|---|---|---|
| CA | 2671705 | 6/2007 |

(Continued)

OTHER PUBLICATIONS

Written Opinion of the International Searching Authority corresponding to PCT/US06/61709 mailed Feb. 14, 2008.

(Continued)

*Primary Examiner* — James D Nigh
(74) *Attorney, Agent, or Firm* — Amster, Rothstein & Ebenstein LLP (57) ABSTRACT

A system for delivery of content-based products. The system includes a content library which provides advanced interfaces for adding, manipulating, arranging and storing multimedia presentations, and for interacting with rich multimedia presentations.

7 Claims, 6 Drawing Sheets

(56) References Cited

U.S. PATENT DOCUMENTS

| | | | |
|---|---|---|---|
| 6,718,551 B1 | 4/2004 | Swix et al. | |
| D507,277 S | 7/2005 | Sitoh | |
| D509,833 S | 9/2005 | Yang | |
| 6,950,804 B2 | 9/2005 | Strietzel | |
| 7,072,569 B2 | 7/2006 | Lakhansingh | |
| 7,131,059 B2 | 10/2006 | Obrador | |
| 7,181,300 B2 | 2/2007 | Robbins | |
| 7,350,191 B1 * | 3/2008 | Kompella et al. | 717/108 |
| 7,385,589 B2 | 6/2008 | Bartels et al. | |
| 7,593,915 B2 * | 9/2009 | Fano et al. | 1/1 |
| 7,624,337 B2 * | 11/2009 | Sull et al. | 715/201 |
| 7,628,730 B1 * | 12/2009 | Watterson et al. | 482/8 |
| 7,643,162 B2 | 1/2010 | Sojian et al. | |
| RE41,524 E | 8/2010 | Parulski et al. | |
| 7,789,800 B1 * | 9/2010 | Watterson et al. | 482/8 |
| 7,936,484 B2 | 5/2011 | Roncal | |
| 8,065,616 B2 * | 11/2011 | Maaniitty et al. | 715/732 |
| 8,108,369 B2 | 1/2012 | Fano et al. | |
| 8,132,202 B2 | 3/2012 | Swix et al. | |
| 2001/0007825 A1 | 7/2001 | Harada et al. | |
| 2002/0022551 A1 * | 2/2002 | Watterson et al. | 482/8 |
| 2002/0069218 A1 * | 6/2002 | Sull et al. | 707/501.1 |
| 2002/0112171 A1 | 8/2002 | Ginter et al. | |
| 2002/0120564 A1 * | 8/2002 | Strietzel | 705/40 |
| 2002/0120929 A1 | 8/2002 | Schwalb et al. | |
| 2002/0131759 A1 | 9/2002 | Lakhansingh | |
| 2003/0016940 A1 | 1/2003 | Robbins | |
| 2003/0069108 A1 | 4/2003 | Kaiserman et al. | |
| 2003/0177503 A1 | 9/2003 | Sull et al. | |
| 2003/0211447 A1 | 11/2003 | Diesel et al. | |
| 2004/0014013 A1 | 1/2004 | Diesel et al. | |
| 2004/0125124 A1 | 7/2004 | Kim et al. | |
| 2004/0128308 A1 | 7/2004 | Obrador | |
| 2004/0128317 A1 | 7/2004 | Sull et al. | |
| 2004/0133597 A1 | 7/2004 | Fano et al. | |
| 2004/0160624 A1 | 8/2004 | Elgar et al. | |
| 2004/0163101 A1 | 8/2004 | Swix et al. | |
| 2004/0205515 A1 | 10/2004 | Socolow et al. | |
| 2005/0026131 A1 | 2/2005 | Elzinga et al. | |
| 2005/0179923 A1 | 8/2005 | Sojian et al. | |
| 2005/0179945 A1 | 8/2005 | Sojian et al. | |
| 2005/0193408 A1 | 9/2005 | Sull et al. | |
| 2005/0193425 A1 | 9/2005 | Sull et al. | |
| 2005/0204337 A1 | 9/2005 | Diesel et al. | |
| 2005/0209050 A1 | 9/2005 | Bartels | |
| 2005/0223318 A1 | 10/2005 | Diesel et al. | |
| 2005/0251820 A1 | 11/2005 | Stefanik et al. | |
| 2005/0268279 A1 | 12/2005 | Paulsen et al. | |
| 2006/0064716 A1 | 3/2006 | Sull et al. | |
| 2006/0136402 A1 * | 6/2006 | Lee | 707/3 |
| 2006/0265730 A1 * | 11/2006 | Hays et al. | 725/110 |
| 2007/0014422 A1 | 1/2007 | Wesemann et al. | |
| 2007/0016928 A1 | 1/2007 | Wesemann et al. | |
| 2007/0016929 A1 | 1/2007 | Wesemann et al. | |
| 2007/0016930 A1 | 1/2007 | Wesemann et al. | |
| 2007/0033170 A1 | 2/2007 | Sull et al. | |
| 2007/0033292 A1 | 2/2007 | Sull et al. | |
| 2007/0033515 A1 | 2/2007 | Sull et al. | |
| 2007/0033521 A1 | 2/2007 | Sull et al. | |
| 2007/0033533 A1 | 2/2007 | Sull et al. | |
| 2007/0038612 A1 | 2/2007 | Sull et al. | |
| 2007/0044010 A1 | 2/2007 | Sull et al. | |
| 2007/0162856 A1 | 7/2007 | Schlossberg et al. | |
| 2007/0162933 A1 | 7/2007 | Hays et al. | |
| 2007/0226315 A1 * | 9/2007 | Espelien | 709/217 |
| 2007/0291323 A1 | 12/2007 | Roncal | |
| 2009/0265649 A1 | 10/2009 | Schlossberg et al. | |
| 2009/0281909 A1 | 11/2009 | Schlossberg et al. | |
| 2010/0011008 A1 | 1/2010 | Fano et al. | |
| 2010/0083077 A1 | 4/2010 | Paulsen et al. | |
| 2011/0072988 A1 | 3/2011 | Elgar et al. | |
| 2011/0093492 A1 | 4/2011 | Sull et al. | |

FOREIGN PATENT DOCUMENTS

| | | | |
|---|---|---|---|
| EP | 1960904 A2 | 8/2008 | |
| WO | 9900782 | 1/1999 | |
| WO | 9950778 | 10/1999 | |
| WO | WO0002143 A1 * | 1/2000 | G06F 17/30 |
| WO | 02069225 | 9/2002 | |
| WO | 2004074961 A2 | 9/2004 | |
| WO | 2006069245 A2 | 6/2006 | |
| WO | 2006125228 A2 | 11/2006 | |
| WO | 2007067936 A2 | 6/2007 | |
| WO | 2007067936 A3 | 6/2007 | |
| WO | 2007126718 A2 | 11/2007 | |
| WO | 2008005319 A1 | 1/2008 | |

OTHER PUBLICATIONS

International Search Report of the International Searching Authority corresponding to PCT/US06/61709 mailed Feb. 14, 2008.
U.S. Appl. No. 11/567,728, filed Dec. 6, 2006.
U.S. Appl. No. 12/404,125, filed Mar. 13, 2009.
U.S. Appl. No. 12/404,143, filed Mar. 13, 2009.
U.S. Appl. No. 60/682,361, "Method and system for mixing and producing recorded audio files," filed May 18, 2005, Confirmation No. 6900, inventors: Jeffrey Hays et al.

* cited by examiner

SYSTEM AND METHOD FOR MANAGEMENT AND DISTRIBUTION OF MULTIMEDIA PRESENTATIONS

This Application is a divisional of U.S. application Ser. No. 11/567,728 filed Dec. 6, 2006, which claims the benefit of U.S. Provisional Patent Application Ser. No. 60/742,930 filed Dec. 6, 2005, the entire disclosure of which are incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of multimedia content generation and assembly, and in particular to systems and methods for assembly and delivery of multimedia objects or elements.

BACKGROUND OF THE INVENTION

Technology has provided increasingly sophisticated tools that allow a content consumer to experience multimedia presentations. A typical consumer has access to interactive multimedia experiences via numerous devices. A user may have experiences with interactive multimedia presentation devices that present one or more of images, video, sound or text. As computing technology has become more ubiquitous, consumers have begun to hear and see the output of electronic media files in many new places. Some of these places include for example the consumer's home, office, and vehicle.

In addition to the revolution that has brought the experience of multimedia to the consumer via numerous devices, there has been a similar revolution in the creation and capture of images, sounds, text and video for media presentations. While many content capture tools continue to require expensive equipment and sophisticated training, simple tools to capture or create media such as images, videos, text and sounds have become available to users.

While simple tools to capture media have become available, tools to combine media such as images, video, and audio files in order to generate and modify multimedia presentations have remained expensive and difficult to use. Management of multimedia presentations requires expensive equipment and training for administrators and users.

Since the advent of the Internet the notion of content and presentation creation and distribution has evolved. In music production, video production, and text creation, it is now accepted that content creation includes not only recording images, animation, video, and sound, but also may include the arrangement and annotation of pre-existing content or the combination of pre-existing content and newly generated content. Unfortunately, the tools that are available for presentation creation have not advanced to the stage of allowing individuals to efficiently create rich and customizable multimedia presentations.

In the context of content generated to support an interactive presentation experience, the generation of multimedia presentations including interrelated and customizable content may greatly improve the experience of the content consumers. A presentation creator is a person or entity that generates a presentation for guiding the experience of a presentation consumer. Often the presentation creator is also the presenter of the presentation. In such cases, the presentation creator is available for guiding the presentation consumer's experience. This guidance may be provided in a variety of forums, for example in an in-person meeting, via video conference, an internet session, audio conference or via other means that allow the presenter to respond to situations, questions, and other opportunities for an interactive experience on the part of the presentation consumer. Sessions involving the ability of the presenter to respond to such presentation consumer interactions will be referred to herein as live sessions.

Frequently, the presenter does not or cannot attend live sessions with the presentation consumer. This may be due, for example, to issues such as the cost of bringing the presenter together with the presentation consumer, schedule conflicts between the presenter and the individual who wishes to experience the presentation, travel on either the presenter's or the presentation consumer's part, etc. In cases in which a live session between the presenter and the presentation consumer are not possible, the presenter sometimes provides the presentation consumer with verbal, written, drawn or other information on one or more sessions that the presentation consumer may experience without the presence of the presenter.

The typical result of the presenter's inability to attend a live session with the presentation consumer (or group of consumers) is a mixture of frustration on the presenter's part regarding the presenter's effort to create and deliver the presentation in a timely, efficient, and clear manner. The presentation consumer must then experience the presentation that is assembled from a multitude of poorly integrated media, for example: written notes, emails, sketches, photos images, and the like. Often when the presentation consumer has to attempt to understand the presenter's instructions and intentions without the benefit of the presenter's presence and the interactivity that the presenter's presence provides the presentation consumer also experiences similar frustration. Presenters lack tools that enable them to conveniently create interactive presentations that presentation consumers may utilize outside of live sessions. Presentation consumers thus lack an easy to use and follow solution.

In addition to the difficulties of providing interactivity efficiently to presentation consumers, there are additional difficulties for a presenter who wishes to monetize his or her presentations. When such a presenter is limited in his or her ability to present interactive presentations outside of live sessions, he or she is typically income limited. That is, a presentation professional's income is usually limited to the number of presentation hours that can be provided in a day, multiplied by the number of days in the week, weeks in the month, and months of the year. While the intention of the presentation professional is to improve the experience of his or her presentation consumers, they are essentially "stuck" with a cap on his or her income based on his or her ability to provide live sessions.

Tools to distribute multimedia files remain difficult to customize and lack the flexibility necessary to provide a strong presentation experience to presentation consumers. Presentation creators interested in sharing multimedia files typically lack distribution tools. Multimedia presentation distribution is performed in a variety of manners, including emailing files, posting media files on web sites or bulletin boards, or simply using postal mail to send digital files recorded on CD, DVD, flash card or similar file storage technology.

SUMMARY OF THE INVENTION

An aspect of the disclosed system and method is directed towards providing software that allows a presentation creator to create and modify presentations in a sophisticated manner. This aspect allows a presentation creator to create presentations that are composed of multimedia elements (such as text, images, sound, video, animation, or other multimedia) and to specify the relationships, meta-data, organization, and overall presentation of the content in order to generate highly sophisticated and flexible presentations. Presentations and the associated multimedia elements may be added to content libraries that may be further combined to make more sophisticated multimedia presentations. The term presentation should be understood to refer to multimedia elements and the software and meta-data used to assemble and present them.

Presentations or programs stored in the content library may be delivered to individuals through a variety of means, including for example one of more of the following delivery means: via a network, via a recordable medium, via a software network, and other presentation delivery means. Presentations or programs may be provided to a content consumer in a variety of file formats. The presentations may be provided to content consumers on any device that are capable of receiving the content from the server.

In an exemplary embodiment, presentation and programs stored in the content library provided are designed by the presentation creator. These presentations or programs may include a variety of types of presentations, for example, instructions on how to perform an action or actions, advice on a course of action, entertainment, and other presentation content. The presentations or programs may be customized in a variety of ways; the customization may include, for example, the order in which the content should be experienced, the form of the presentation, and the images, videos, animations, audio content, and instructional tips within the presentation and program.

Certain embodiments of the invention are directed towards a user interface for the creation of a multimedia presentation. The user interface may provide a presentation creator with the ability to combine media elements such as audio, video, animation, text, images, and other media into rich multimedia objects. The rich multimedia objects may be stored and manipulated in a hierarchical content library that provides support for efficient location and manipulation of the content. The user interface may provide access to the content library and presentation editing software.

In accordance with some embodiments, a content distribution model allows a content creator, content manager, content publisher, or content distributor to coordinate, control, and monetize the distribution of multimedia content. Presentations may be created and customized within the content library.

DETAILED DESCRIPTION

Specific embodiments of the invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It also will be understood that, as used herein, the term "comprising" or the term "comprises" is open-ended, and includes one or more stated elements, steps or functions without precluding one or more unstated elements, steps or functions. It should be understood that when an element is referred to as being "connected" or "coupled" to another element, it may be directly connected or coupled to the other element or intervening elements may be present.

The present invention is described below with reference to block diagrams and operational illustrations of methods and devices to create, modify, and use multimedia presentations. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
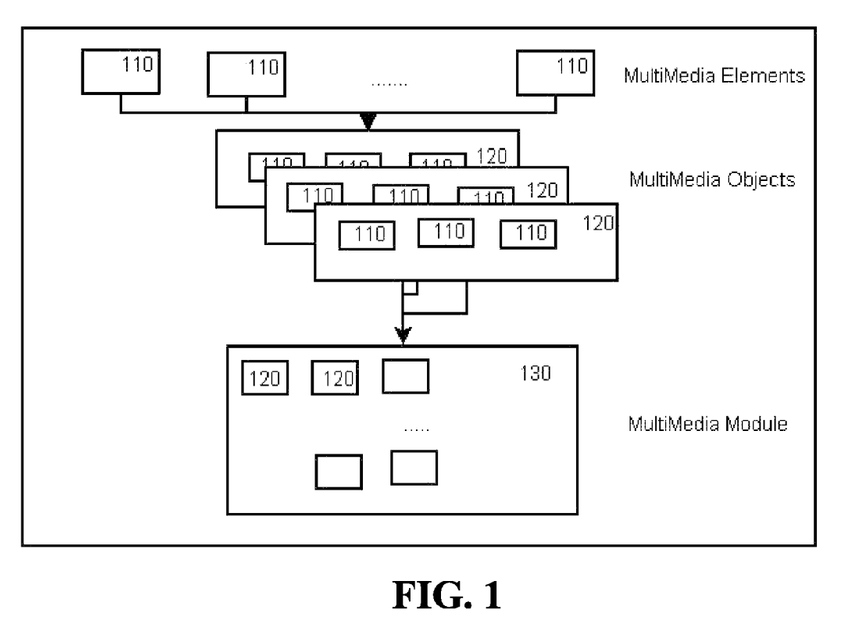
FIG. 1 shows a relationship tree illustrating the relationship between multimedia elements, multimedia objects and multimedia sets according to some embodiments of the invention.

As used herein, the term multimedia element refers to a digital object that may be processed by a digital processing apparatus in order to generate one or more of the following types of output from a digital processing apparatus examples of such output: sound, graphics, text, animation, video, or images. The term multimedia object refers to a computer readable file or program that is comprised of a combination of one or more multimedia elements. FIG. 1 illustrates the relationship between multimedia elements 110, multimedia objects 120, and multimedia modules 130. Multimedia elements 110 are combined to create multimedia objects 120; multimedia objects 120 are further combined to create multimedia modules 130. In some embodiments, multimedia objects 120 may include multimedia elements 110 of the same or different types. In some embodiments multimedia modules 130 may include combinations of different types of multimedia objects 120 and multimedia elements 110. As used herein the term interactive should be understood to refer to the capability of a system, device or set of computer instructions to respond to user input.

As used herein, the term content creator refers to an individual, a set of individuals or an entity that creates content in the system. Content creation may include, for example, uploading content into a content library. Content creation may include, for example, editing or manipulating content that is pre-existing in the library. Content creation may include, for example, re-arranging content that exists in the content library. Moreover, content creation may include a combination of each of the above-listed activities. The term content creator should also be understood to be used interchangeably with the term presentation creator inasmuch as a presentation creator may perform any of the roles ascribed to the content creator above. The term content manager and the term presentation manager should also be understood to be used interchangeably and to correspond to an individual, individuals or an entity that is involved with the management of the content library. Content managers and presentation managers may, for example, manage the distribution of content. Content managers and presentation managers may, for example, manage the revenue received in association with the distribution of content. Content managers and presentation managers may, for example, manage other administrative functions of the content library, such as access, report generation, and the like.

An embodiment of the invention includes a content library and an associated user interface. The content library consists of a computer including a database or equivalent data storage software and associated processing, disk, networking, memory, and user interface for storing, organizing, accessing and managing digital multimedia objects. The user interface allows actors with access to the content library to upload, download, modify, and otherwise interact with the content library. These actors may include various parties who interact with the content and presentations or programs that are stored in the content library. The actors may be, for example, any one of or a combination of: a content creator, an entity responsible for uploading content to the content library, a content librarian who has administrative access to the content library, an individual who modifies features of content, an individual who is interested in purchasing or accessing content or programs or presentations stored in the content library.

The content library further comprises a database for storing information related to the multimedia objects stored therein. This database maintains information related to the stored content as well as information related to the accessing of the content in the form of presentations that may include combinations or multimedia objects, multimedia elements, and related information.

FIG. 1 shows the relationship between media elements (such as images, animation, video, sound, or other media files), that may be assembled into multimedia objects that contain one or more media elements. As the files are assembled into a multimedia presentation by the content creators, annotations may be added to the assembly in the form of text, or other multimedia objects. The multimedia objects may be further assembled into multimedia modules. The multimedia modules may be edited to create content presentations. The editing of the multimedia modules may, for example, include adding multimedia elements such as text, graphics, animation, video or other multimedia to the modules. An exemplary editing process may include adding a textual or graphical overlay to each multimedia object in the presentation. The editing of the multimedia modules may include changing the time order or spatial relationship in which the multimedia objects will be presented to the content consumer. These presentations may then be stored and edited. Once the presentations have been committed to the content library they may be made available for sale, download, or interaction by content consumers.

Figure 2:
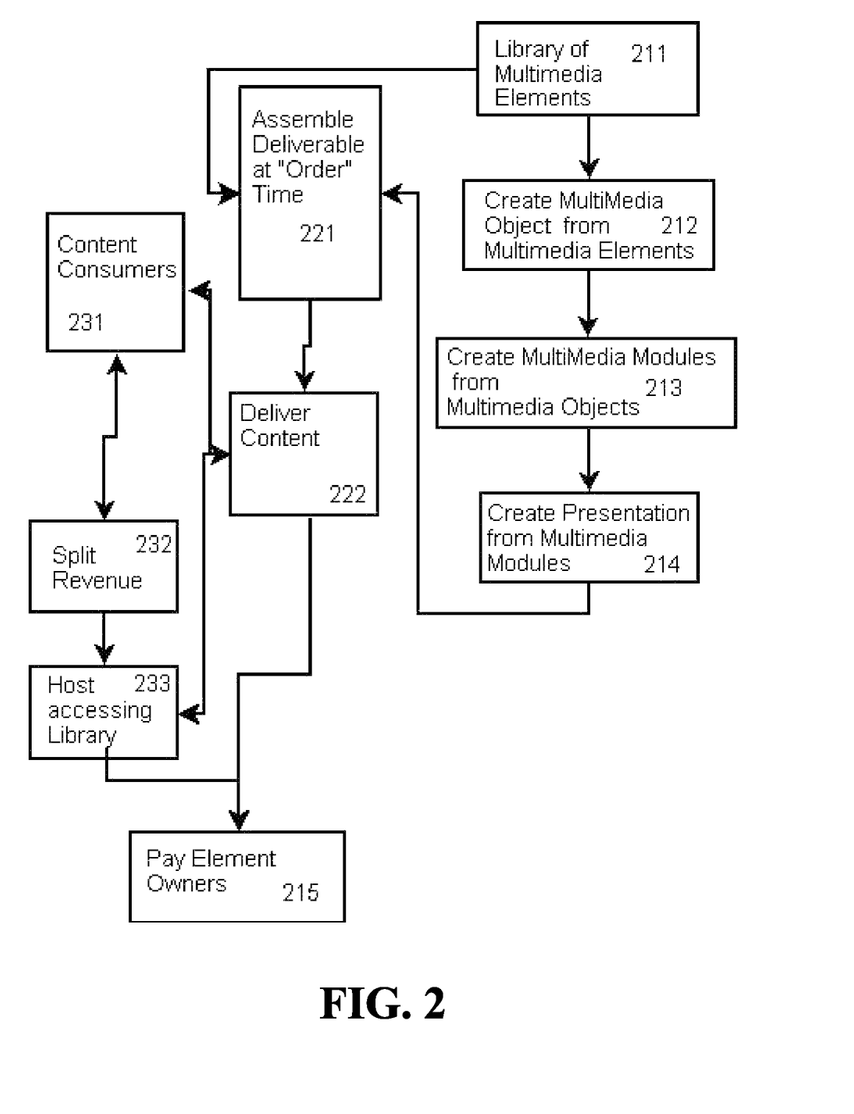
FIG. 2 shows a flow diagram illustrating an exemplary embodiment in which content is added to the library, created and accessed by a consumer and/or a content host.

FIG. 2 illustrates a flow chart according to certain embodiments of the invention. A presentation creator may interact with the content library that includes a library of multimedia elements 211. In some embodiments, a content creator may create multimedia objects from multimedia elements as in step 212. The step 212 of creating multimedia objects may include for example, adding one or more multimedia elements to the library, editing multimedia elements that are stored in the library or adding related content such as metadata to the library. The step of creating multimedia modules 213 may include for example associating two or more multimedia objects together to create multimedia modules that may be presented to content consumers.

In the case that a presentation exists in the content library, either because the content has just been created or because the content existed prior to the content creator's current session with the content library, the content creator or producer may proceed to step 221 wherein the content presentation is assembled into a deliverable. This step may be performed by the content creator, the content producer or, the content consumer, or by the system itself in an automated manner. This step may include, for example, determining the spatial and temporal relationships among the elements, objects and modules of the presentation. This step may also include adding additional content to the presentation, such as an overlay on the presentation images, animation, video or audio. This step of adding additional content may, for instance, be used by a third party to add branding to the presentation. For example, where the module is a fitness presentation, a personal trainer can perform this step to add his branding to a presentation before making it available to his clients for sale via download or viewing/display on the system using, e.g., a web browser.

In order to access a presentation via the content library, an entity such as a content consumer, a content host, or a third party applying his brand to the content, may interact with the content library to download or view a presentation. This step 222 of delivery of content may include transmitting the content to a transferable medium such as a CD, DVD, or other recordable medium. This step may also include transmitting the presentation over a network such as the internet. The step of delivery of content may involve transferring content directly to content consumers. In the case wherein content is delivered directly to consumers, the content library may collect payment from the content consumer. In certain cases, the content library may transmit some or all of the payment collected from the content consumer to the element owners 215.

In some cases a host or content distributor may perform a step 233 of accessing the content library in order to distribute content to the content consumers 231. In the case where the content is a fitness presentation, for example, this step may be performed by a content distributor such as a gym owner or personal trainer who distributes his branded fitness presentation to gym patrons. In certain embodiments, content distributors may collect all or a portion of the revenue generated from content consumers accessing the content via the content library. All or a portion of the revenue collected for a presentation may be transmitted to the content library itself. In certain embodiments some or all of the revenue collected for a presentation may be split, as in step 232, between content creators and element owners; see step 215. In other embodiments, revenue is generated using a subscription model wherein users are charged a fee on a regular basis, e.g., monthly or annually, for access to the system. In further embodiments, access to the system is sold organizations for the benefit of their members. For example, in an embodiment wherein the system contains content relating to exercise and fitness, revenue can be generated via subscriptions by gyms which, in turn, provide access to the system to their members as a benefit of membership. Revenue can further be generated by bulk sales of subscriptions to resellers, which in turn sell the service at retail or wholesale.

Figure 3:
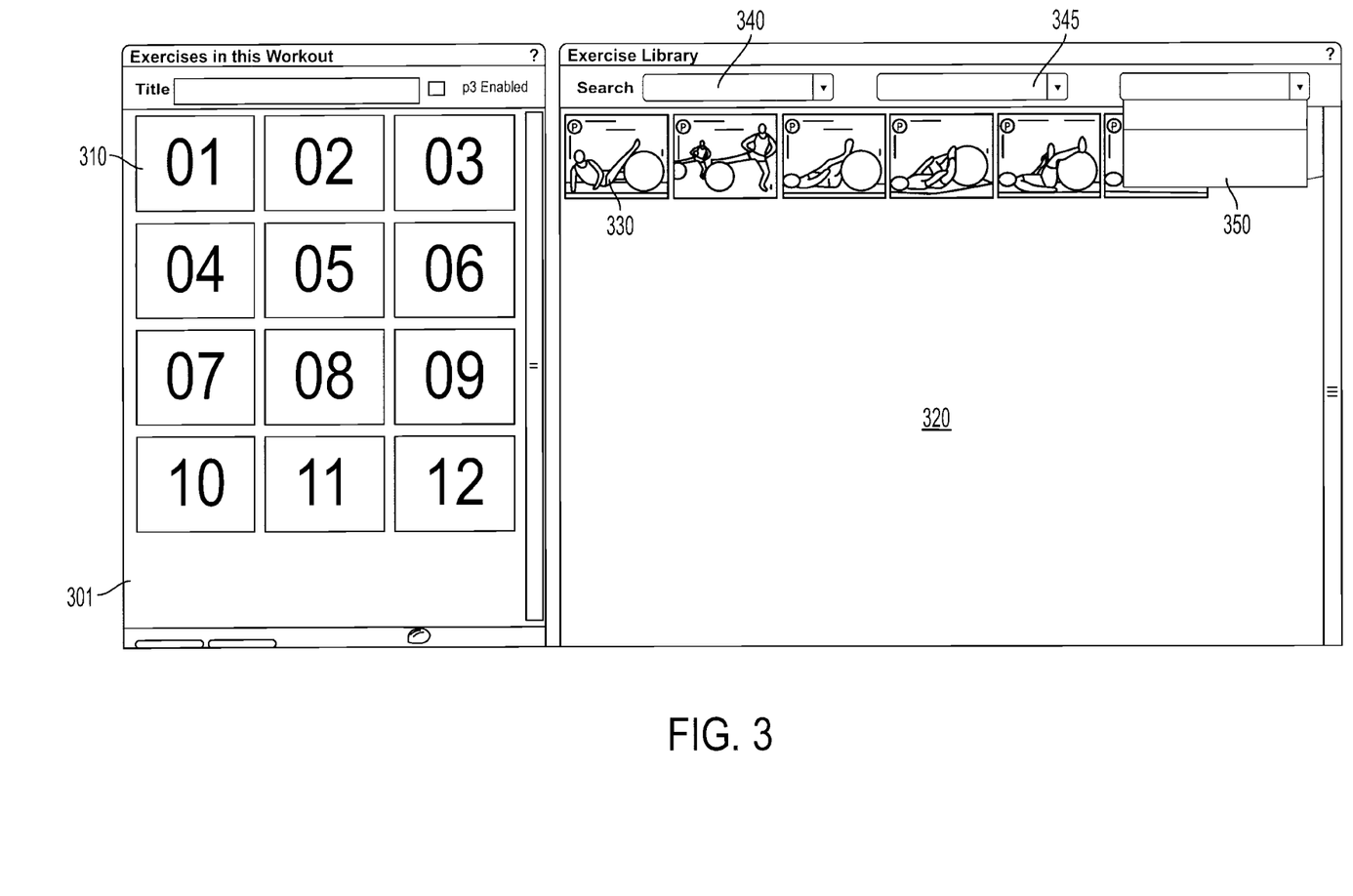
FIG. 3 shows a graphical representation illustrating an exemplary embodiment of a user interface for the assembly of multimedia objects into a presentation.

FIG. 3 shows an example illustrating an embodiment of a user interface for the assembly of multimedia modules based on the ordered assembly of multimedia objects. The content presentation creator or content producer can perform a search by typing text into a search field 340 of the interface or by selecting pre-existing lists based on the content metadata. The results 330 of this search or selection are multimedia objects that are displayed in the results window 320. Note that this user interface also allows the user to filter the results of the search using a second filter drop down 345 and a third filter drop down 350. In the case wherein the user selects a filter for the search results 330 displayed in the results window 320, the results displayed will be limited to those results that are consistent with the user-selected filter. For example, if the user selects a filter "male" from the filter drop down 350, the results displayed in the results window will only include those results that are appropriate for males. In some embodiments the filter may comprise restrictions such as language, skill level, or other criteria for the selection of multimedia content. The user may use the search and filter functions to identify a set of multimedia objects 330 that appear in the results window 320. In the case wherein the user is a content creator or content producer who is selecting content in order to create a multimedia presentation, the user may select multimedia objects, which are shown in this example on the right side of the screen, to be dragged and dropped onto the content assembly window 301. Note that the content assembly window 301 includes position numbers 310 onto which the multimedia objects may be dragged. The position numbers 310 correspond to the order in which the multimedia objects 330 dragged onto the content assembly window will be experienced by the content consumer. Once the content creator or content producer has selected a position number 310 to associate with the multimedia object, the content creator or content producer may use their user input device to "drop" the multimedia object onto that square in order to associate the multimedia object with that place in the order of the presentation experience. The position numbers 310 are used to determine the time ordering of the content consumer experience of the presentation. When a new multimedia object is dragged to a position in the assembly window 301 that is between two filled position numbers, objects which were placed downstream from such position are bumped to a new position to make room for such insertion. Multimedia objects can be deleted from the assembly window by dragging the objects and dropping them outside the assembly window 301. After placement of media objects onto positions in the assembly window 301, the objects can be repositioned in a like manner, e.g., by dragging and dropping objects from one position to another within the assembly window 301.

An embodiment of the invention includes a multimedia presentation creation and editing interface that allows a presentation creator to interact with a content library. This interface may be realized via software that runs on a computer such as a laptop, server computer, personal computer, personal digital assistant (PDA), and other device capable of programmatic interactivity. In an embodiment of this interface, the interface may provide access to a content library that runs on the same computing device as the interface software. In another embodiment of this interface, the interface software may run on a computing device and communicate via a network or other connection with a separate computing device on which the content library runs. Multiple libraries can be simultaneously accessed, and such libraries may reside on multiple computers and/or computers on multiple networks.

A user interface for the creation of a presentation according to the invention may support interaction with the content library for several actors. Each of these actors may have unique access or action rights in terms of their ability to interact with the content stored in the content library. For example, an individual interested in purchasing may have access restricted to complete prebuilt presentations, while a content creator may be provided access which is not so-restricted.

The interface allows the presentation creator to examine a subset of the media stored in the library and to select specific media elements to be arranged in a particular order. Note that each media element may be edited, for example, by adding or altering the text in the presentation, altering or adding images, altering or adding audio files or altering or adding other media content. It should further be noted that the presenter of the presentation and the audience for the presentation may be one and the same person. For example, the system may be used by an athlete to create a custom workout presentation for his own consumption. The system may be designed so as to be configurable such that objects are dynamically associated with multimedia objects depending upon the user profile of the particular user who has logged into the system. For example, where a user who is a member of particular gym (which subscribes to the system) is logged into the system, that gym's logo may be overlayed on or otherwise associated with each element in the content library when such element is displayed to the user. Thus, when user A who is a member of gym X is logged in, the images or other multimedia content in the content library appear with the logo of gym X overlayed thereon, but when a user B who is a member of gym Y is logged in, those same images/content appear with the logo of gym Y overlayed thereon.

Figure 4:
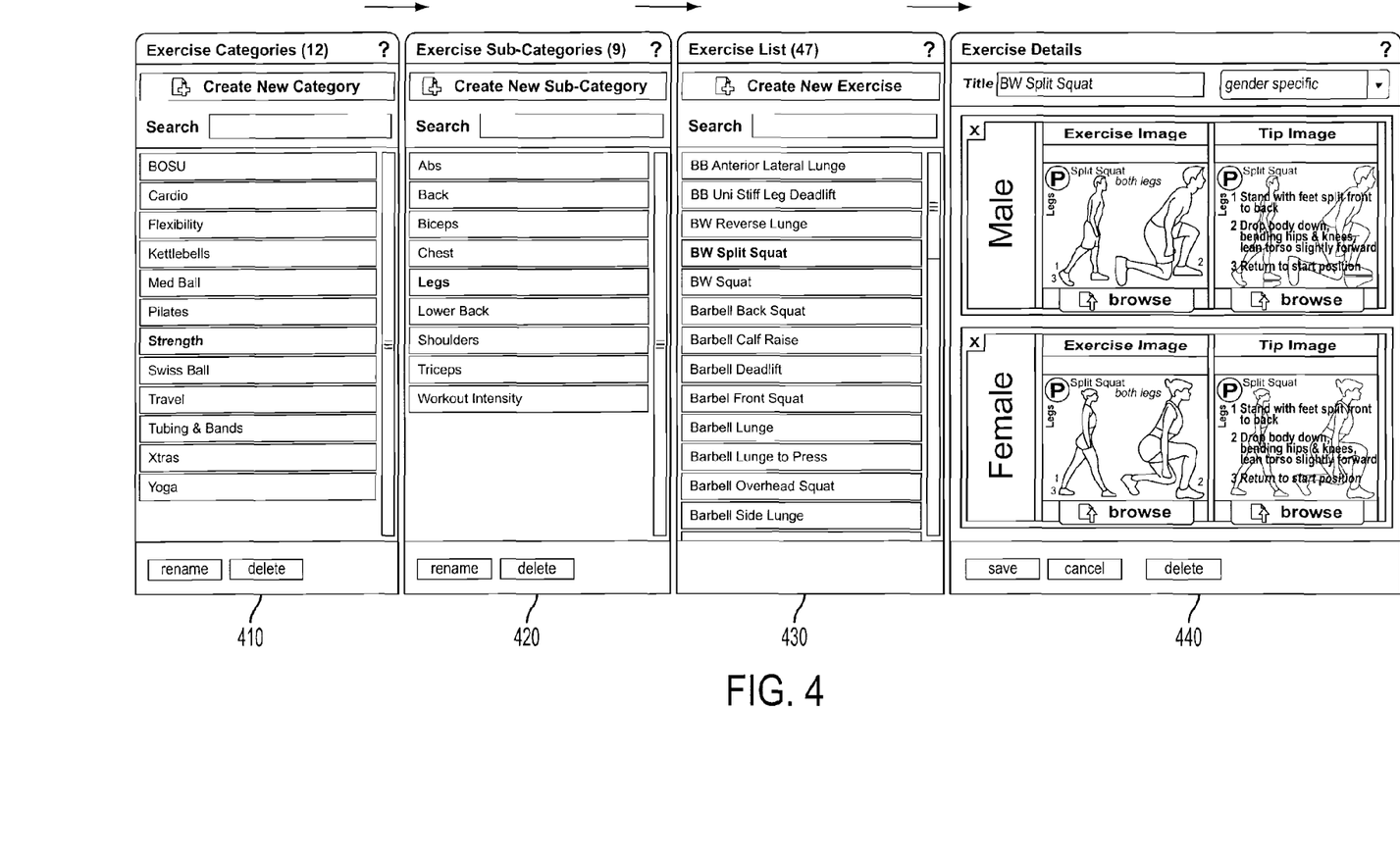
FIG. 4 shows a graphical representation illustrating an exemplary embodiment of a user interface for selection and viewing of the content making up a presentation.

FIG. 4 shows an example illustrating the system's user interface for creating one or more new multimedia objects and associating with such objects the hierarchical metadata which permits the objects to be operated upon by the filters discussed above with reference to FIG. 3. In this example, the objects to be created are exercise instruction slides. The system first presents the user with an Exercise Categories window 410 which prompts the user to select a pre-existing category, or create and select a new category, to be associated with his new object(s). Once the category for the object(s) has been selected, an Exercise Sub-Categories window 420 is additionally displayed. The Exercise Sub-Categories window 420 prompts the user to select a pre-existing subcategory, or create and select a new subcategory, to be associated with his new object. Once the subcategory for the object(s) has been selected, an Exercise List window 430 is additionally displayed. The Exercise List window 430 prompts the user to select an exercise name, or create and select a new exercise name, to be associated with his new object(s).

Once the exercise name for the new object has been selected, an Exercise Details window 440 is additionally displayed. This window displays the new objects, which in this example are a "male" exercise image and a "female" exercise image. The "male" image will have the following metadata associated with it: Category: Strength, Sub-Category: Legs, Exercise: BW Split Squat, and Gender: Male. The "female" image will have the following metadata associated with it: Category: Strength, Sub-Category: Legs, Exercise: BW Split Squat, and Gender: Female. Browse buttons are provided for each exercise image and each tip image to allow the user to browse a multimedia library, either on his local machine or a remote machine, to select a multimedia element for use in the object. In this example, an image of a male performing a split squat exercise has been selected for the "male" object and an image of a female performing a split squat exercise has been selected for the "female" object. Alternative tip images can be associated with each object using the Exercise Details window. In this example, each object has associated with it a tip image comprising the exercise image with instructional text overlayed thereon. Tip images are discussed in further detail below.

In certain embodiments of the invention, an actor's experience using the interface may be governed by permissions associated with their account or profile. An actor with the appropriate permissions may create new categories for classification of content, while an actor with another set of permissions may, for example, only be able to view content in the content library.

The multimedia object may be given a name for later access from the library by an actor with the appropriate permissions to access it. Among the actors with permission to access or modify content in the library, may be, for example, the actor who added it to the system, which may or may not be the presentation creator.

The multimedia object may have one or more files or other electronic information attached to it. Depending on the specifics of the multimedia object or presentation, the actor may be able to choose from multiple modes of interacting (e.g. editing, listening, viewing, or any other interaction appropriate to the multimedia object type or form) with the content. In one embodiment, for example, the content may include meta-data that labels the content as person-type specific; that is, the content is tagged as being more appropriate for a certain type of content consumer. In one embodiment of the invention, a given multimedia object will have one or more different types of objects stored for a level in the hierarchy. When an actor or content consumer requests access to that multimedia object, the specific details of the object returned from the content library may differ depending on the type associated with the request. An exemplary instance of such a type is a presentation or multimedia object illustrating the steps required to perform a physical exercise, such as a pull-up exercise performed on a chin-up bar. Depending on the gender of the content consumer the presentation may include images of a female or a male performing the steps of the exercise. A presentation may separately store the multimedia objects associated with the male and female exercise presentations, but each gender specific presentation will be classified within the hierarchical storage system under, for example, the classification physical fitness, pull-up. In an exemplary embodiment, the content provided may include content relating to a diet program. Such content may be customized to meet the unique dietary, health or fitness needs of the content consumer.

The multimedia objects created as part of the presentation may, for example, be images that are assembled from the media elements by the content creator. Included within the multimedia objects may be elements such as images, links to video, graphical or textual overlays, or links to other multimedia content contained within the library or accessible through other sites or network locations available through the network.

An example of a multimedia element that may be included in a multimedia object is a tip file. Tip files are optionally added to the multimedia objects as clickable links. When a user selects or clicks a link, text or an alternative image appears, for example in the form of a popup window, the text or image including information pertinent to the object. An example would be text providing additional information on the image or other multimedia elements included in the presentation.

Figure 5:
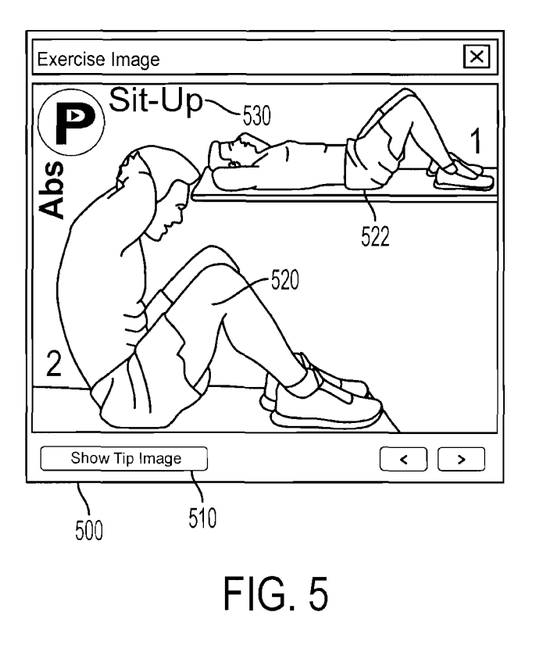
FIG. 5 shows a graphical representation illustrating an exemplary embodiment of a multimedia object which may be included in a presentation.
Figure 6:
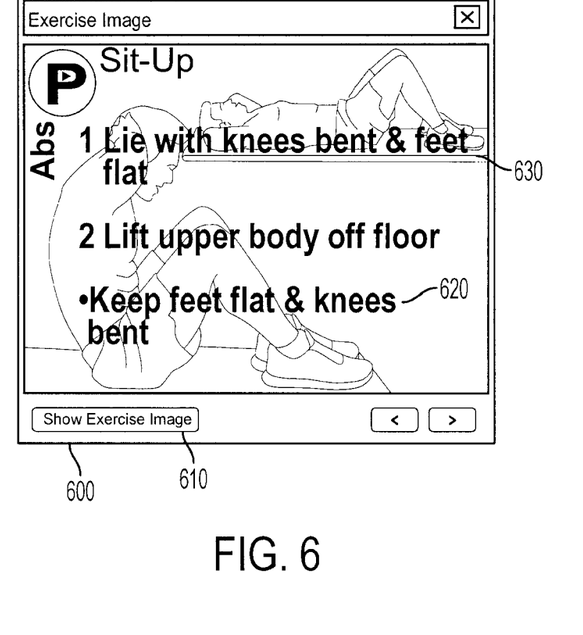
FIG. 6 shows a graphical representation illustrating an exemplary embodiment of a multimedia object including an overlay with associated text.

FIGS. 5 and 6 illustrate a multimedia object resulting from assembly of multimedia elements according to certain embodiments of the invention. Boxes 500 and 600 are visual boxes containing multimedia elements that make up the multimedia object. FIG. 5 includes a Show Tip Image button 510 which, when selected, causes the Tip Image from an associated Tip File to be displayed. An exemplary Tip Image associated with the multimedia object shown in FIG. 5 is illustrated in FIG. 6. Note that FIG. 5 includes multiple images 520 and 522 as well as text 530 and other associated multimedia elements making up the multimedia object. The Tip image 630 can be displayed in an overlay fashion over an underlying multimedia element 620 when the "Show Exercise Image" button 610 is depressed.

Each multimedia object may also be associated with one or more companion multimedia objects. In an embodiment of the content library that includes a presentation detailing the steps of a physical fitness workout, for example, each multimedia file or files associated with a particular exercise may have a corresponding instructional tip file or files. The tip file or files may be added separately but are typically associated in the content library catalog with the multimedia files of the exercise.

In one embodiment of the invention, the content library software runs on a processor that is part of a computer that is local to the content creator, for instance a laptop, personal computer, or personal digital assistant (PDA). In another embodiment, the content library software runs on a remote server, while the user interface to the content assembly and editing library is provided over a network to a device local to the content creator.

In an exemplary embodiment of the invention, the assembled multimedia presentations may be stored in a content library, or multiple libraries, that allows the content creators to upload the presentations to a site that is accessible over the network. The content library stores the multimedia presentation in a manner that allows the content creator or other authorized individual to manipulate the multimedia elements that make up the presentation. The manipulation of the multimedia elements in the content library allows the content to be easily customized in order to meet the needs of the content consumer or content distributor. Examples of manipulations that the content library allows includes, but are not limited to: re-arranging multimedia objects in the presentations, changing the audio or video or animation or other multimedia components of the presentation, varying the language of the text or audio of the presentation, varying the specific parameters of a multimedia element (such as for example an image file) within a multimedia presentation, and other efforts to create variations that cause the content to be optimized for a particular consumer or distributor.

The content library achieves the customizability by storing each multimedia element (for example image, video, animation, text, and audio) individually within the storage associated with the content server. The content library also stores meta-data corresponding to the order and relationship of the images within the presentation. The storage architecture allows for fast and easy customization of the presentations. In addition, the flexibility inherent in this architecture allows for simple replacement of multi-media element when convenient.

An embodiment of the invention includes a software module or software modules within the content library that support the ability of presentation creators and presentation managers to monetize presentations by providing them with the ability to make presentations commercially available. In an embodiment of the invention, a presentation creator or presentation manager may register with a system that provides access to the content library in order to create a presentation utilizing the content in the library or to upload an existing presentation. In either case, further customization may be added to registered content. The presentation creator or presentation manager may also upload information describing product offerings or other related information, such as biography information, information regarding the presentation philosophy of the presentation manager, e.g., the trainer. Once the content is registered as available to content consumers, the consumers may access it via the content library. The presentation can become detached from the system as a stand-alone download, file, movie, printout, etc., or may be made available for viewing online via the system. In some embodiments the content consumers may be charged a fee for access to the content. In some embodiments the fee may be dependent in on the specifics of the presentation accessed. For example, in the case in which a customized version of a presentation is accessed, the content consumer may be charged a different rate for including certain specific content in the presentation or for requesting the presentation in a particular format or order.

In some embodiments of the invention, the fees charged to access the content library may be provided to the content creator in an electronic format. In some embodiments of the invention, fees charged to content consumers may be distributed among one or more parties, for example, a part of the income derived from providing access to a presentation may be provided to a party that makes the content library available and a part of the income derived from the fee may be provided to the content creator or other parties involved in the creation or distribution of the presentation.

In some embodiments advertising material may be included in the content library. In particular, the content library manager or presentation creator may include advertising content in presentation itself or in the content library user interface. The advertising content may include for example multimedia objects as well as clickable links that would allow a content consumer to acquire additional information regarding an advertised product or products.

In some embodiments, advertising material can be customized based on the content included in the presentation. In some embodiments, advertising material is customized based on the interest of the content consumers. The advertising material may be included as multimedia elements or multimedia objects within the presentation. In some embodiments advertising may be overlaid on the images or video in the presentation.

In some embodiments, advertisers can pay for advertising material to be included in presentations accessed via the content library. The advertisers may provide advertising content to be included in the content library. This content is registered with the content library as associated advertiser who has provided content. The content library maintains a record of the registered content for use administrative actions including, for example tracking content usage. This advertising content may include: images, video or other types of multimedia elements to be inserted into presentations accessed via the library. The content library may collect information regarding the inclusion of content in presentations or the accessing of the advertising content included in the library. In some embodiments the advertisers may pay for content to be included in the library. In other embodiments, the content library will track the inclusion of advertising content included in the presentations. Based on the information regarding the content access the advertisers may receive an invoice to provide revenue to the administrators of the content library.

In some embodiments the advertising content included in the presentation will be specifically targeted at the interests of the content consumers. In certain embodiments, the content library will maintain a database of registered content consumers. The profile information may include demographic information, information on interests, information on content and advertising that has been previously accessed and other information that can be useful in the targeting of advertising to a consumer.

In certain embodiments of the invention content may be delivered to content consumers through a variety of formats depending on the content consumers needs. Devices that may access presentations or programs received from the content library may include for example one or more of the following devices that are capable of presenting media elements: personal computers, laptop computers, personal digital assistants, mp3 players, mobile telephones, and other devices that may provide interactive presentation experiences. The multimedia modules or presentations may be transmitted directly to such devices without the necessity of user-prompted downloading or synchronizing, via transmission mediums such as wireless networks, wired networks, cellular networks, Bluetooth, and other data transmission means.

In some embodiments content providers may register specific content, which may be one or more of the following content types: multimedia elements, multimedia objects, multimedia modules, and presentations. The content registration information may be stored in a database in the content library. The content registration information may be used, for example, to determine the distribution of revenue associated with content access. Content providers who register with the content library may receive a part of the revenue collected from content consumers. Note that the content library may register information associated with a particular organization of content included in the presentation. This registration information may be used to distribute revenue associated with access to the presentation to individuals or entities who registered content organization.

An exemplary implementation of the invention provides a presentation including fitness instruction on a computing device such as a laptop, personal computer, mobile phone or portable media player. Sequential still training photos with workout instructions overlaid thereon are displayed on the computing device. Still images may be accompanied by multimedia content for example: background music, audio instruction, or video.

The presentation comprises multiple fitness training modules; each module including multimedia content—for example multiple high-resolution image or video exercises. Each training module may include multiple workouts. The set of training modules comprising a fitness program for use by a content consumer interested in improving his or her physical fitness training techniques. The training modules may include, for example, video, animation, still images, text, or similar content appropriate to communicating the training material. The training modules may include for example workout instructions overlaid upon each image. Each trainer module may have, for example, between 9 and 50 exercises.

Each training module associated with an exercise may include content illustrating or explaining positions in the exercise. For example, a training module may include content describing or illustrating starting positions and end positions for an exercise. The module shows the content consumer details of the exercise, for example the body part to be exercised, the exercise name, and the proper form for performing the exercise.

Image exercises may include usage tips that guide the user through the steps of the exercise. When the images are sequentially displayed, the tips may guide the user through each step of the exercise program.

Trainer modules may be provided for each of several different workout routines, including, e.g., an abdominal workout, cardiovascular workout, Pilates, yoga, or other types of physical fitness training. Each trainer module that is downloaded from the content library is downloaded in a format appropriate to the device that will be used for viewing the content. For example, for some viewing devices the presentation may be provided from the content library as a collection of JPEG formatted images. The user may use commercial off-the-shelf software, such as iPhoto available from Apple Computer of Cupertino, Calif., to transfer images to the portable media player. Other software, such as Microsoft Windows XP, Adobe Photoshop Album, Adobe Photoshop Elements, Palm OS software, etc., may be used. The trainer modules may be transmitted in the form of a compressed file which is downloadable from an online store for a fee or saleable on media such as CD-ROM. After downloading a module and, if necessary, decompressing the images therein into a folder on the user's computer, the user may synchronize the computer with the portable media player to transfer the contents of the folder to the portable media player. Alternatively, the module may be directly transmitted to a user's device without the need for downloading or synchronization.

Certain embodiments of the invention may work in conjunction with commercially available handheld portable media players such as the iPod or, iPod nano from Apple Computer of Cupertino, Calif., the Handspring Treo available from Palm, Inc. of Sunnyvale, Calif., or the Blackberry Color available from Research In Motion of Ontario, Canada. The user may move from one exercise to the next using the "next" button, scroll wheel, or the like, on the portable media player until he has finished the workout. In order to give variation to the user's workout, the user may customize a trainer module by changing the order of the exercise images or even combining multiple trainer modules. In alternative or additional embodiments, an automated timed slideshow or video tutorial may be provided.

Certain embodiments of the invention may also include a system and method for providing professional personal trainers with the ability to create their own trainer modules. These training modules may be monetized by providing an interface to collect revenue. This interface may be associated with the download of a presentation or media element, or other access to content stored in or linked with the content library Once the personal trainer has signed up for this service via a commercial web site, the trainer may create a page describing the product offering. Such a site may include a biography of the trainer; information on the trainer's training philosophy, and the like. Such a page could itself contain multimedia elements such as sound, video, animation, images, and other information. The trainer may go to a Creation Store section of the online store and choose from different body parts (Abs, Biceps, Triceps, Chest, etc.). When he or she chooses a body part, a set of standard images (for men/women) display. The personal trainer drags and drops the images they want in the trainer module. They may, for example be interacting with an of the user interface area that allows them to create the trainer's own customized trainer module. They may upload an image, choose from different instructions available in the content library or otherwise customize or assemble a multimedia presentation. A newly created customized trainer module may then be submitted to administrators of the online store for approval. Once approved, the customized trainer module may be placed on the online store for the personal trainer's clients/potential clients to buy or download. Revenue from such sales may be split between the personal trainer and the administrators of the online store.

In an embodiment of the invention a content library is provided that stores a plurality of content elements, where content elements should be understood to include for example, presentations, multimedia objects, and multimedia elements such as video, animation, image, text, audio or other multimedia files. The content library may also include an interface that provides for an entity to add content elements to the content library and for combining multimedia elements into multimedia objects or other content elements. The content library may also provide an interface for selecting one or more presentations comprised of content elements and for creating a product comprising at least the presentation comprised of content elements. The content library may also compromise modules that are capable of assembling a deliverable corresponding to a selected product. Where the deliverable may include for example multimedia elements and multimedia objects which may or may not be included in the selected presentation. The content library may also include an interface that allows a content consumer to order and receive the deliverable in a format appropriate to the device that they wish to use to access the presentation.

In an embodiment of the invention a user interface is provided that allows a user to select one or more multimedia elements or multimedia objects from a content library. The selected multimedia elements or multimedia objects typically having one or more associated attributes or meta-data. The user interface providing an interface to select a filter for filtering the contents of the content library. Where the filter is provided to filter content based on one or more attributes of the content in the library. The user interface a providing a display for viewing the output of the filter. The user interface including an arranging or ordered assembly tool that allows a user to register in the content library an order that the multimedia objects or contents will be experienced by a content consumer. The registration of the order of experience may be done for example by dragging and dropping images or icons associated with the content onto an area of a window. Note that in an embodiment of the invention, the output of the filter may be visible to the user and available to be dragged onto the arranging or ordered assemble tool.

In an embodiment of the invention is a media construction system. The media construction system available to construct presentations for presentation to content consumers. The presentations are comprised of a set of media objects. The media objects that are comprised of a set of media elements, where media elements should be understood to mean for example images, audio, video, animation, olfactory or other multimedia files that may be accessed and stored electronically. The system includes a library for the storage of presentations, multimedia objects, and multimedia elements. The library including software to support the creation of presentations. The creation of presentations including the selection of one or more multimedia objects and a definition of a relationship between one or more multimedia objects. The library also including storage for storing the presentations defined in terms of selected multimedia objects and relationships associated with a presentation.

In an embodiment of the invention is a media construction system. The media construction system available to construct presentations for presentation to content consumers. The presentations are comprised of a set of media objects. The media objects that are comprised of a set of media elements, where media elements should be understood to mean for example images, audio, video, animation, olfactory or other media files that may be accessed and stored electronically. The system includes a library for the storage of presentations, multimedia objects, and multimedia elements. The library including software to support the creation of presentations. The creation of presentations including the selection of one or more multimedia objects and a definition of a relationship between one or more multimedia objects. The library also including storage for storing the presentations defined in terms of selected multimedia objects and relationships associated with a presentation.

In certain embodiments of the invention, the customization provided by the content library and its user interface may be used to focus presentations to the specific needs of a content consumer or consumers. Once a presentation has been created in the content library, it may be delivered to a content consumer either directly or through an intermediary. The ability to provide interactive presentations through intermediaries may allow content creators additional opportunity to monetize their presentation skills as well as creating new opportunities for other agents in the chain of providing presentation to receive reimbursement for the efforts.

While the invention has been particularly shown and described with reference to a preferred embodiment thereof, it will be understood by those skilled in the art that various changes in form and details may be made therein without departing from the spirit and scope of the invention.

In the drawings and specifications, there have been disclosed embodiments of the invention and, although specific terms are employed, they are used in a generic and descriptive sense only and not for purposes of limitation, the scope of the invention being set forth in the following claims.

The invention claimed is:

1. A method comprising:
accessing, using one or more computers, an electronic database, the electronic database comprising one or more media elements comprising at least one of an image representing an exercise and a video representing an exercise;
adding, using the one or more computers, one or more media elements comprising at least one of an image representing an exercise and a video representing an exercise to the electronic database;
selecting, using the one or more computers, at least two media elements stored in the electronic database;
combining, using the one or more computers, the selected media elements to form one or more media objects;
storing, using the one or more computers, the one or more media objects in the electronic database;
allowing, using the one or more computers, a first user to arrange the one or more media objects in a designated order, where the arranged one or more media objects form a complete presentation;
providing, by the one or more computers, the complete presentation, wherein the complete presentation represents a workout routine
storing, by the one or more computers, the complete presentation in a content library;
restricting, by the one or more computers, one or more second users from accessing the complete presentation; and
providing, by the one or more computers, the one or more second users with access to the complete presentation in accordance with access rights.

2. The method of claim 1, wherein the one or more computers are associated with a user input device.

3. The method of claim 2, wherein the user input device comprises one or more mobile devices.

4. The method of claim 1, wherein the step of adding, using the one or more computers, one or more media elements comprising at least one of an image representing an exercise and a video representing an exercise to the electronic database comprises:
uploading one or more media elements from the more computers to the electronic database.

5. The method of claim 1, wherein the step of adding, using the one or more computers, one or more media elements comprising at least one of an image representing an exercise and a video representing an exercise to the electronic database comprises:
attaching one or more media elements from a second electronic database stored on one or more other computers.

6. The method of claim 5, wherein the one or more other computers are associated with one or more devices.

7. The method of claim 5, wherein the one or more devices comprise one or more mobile devices.

* * * * *